(12) United States Patent
Podgorney et al.

(10) Patent No.: US 7,226,115 B1
(45) Date of Patent: Jun. 5, 2007

(54) FOLDING CAMPING TRAILER WITH FLUSHABLE TOILET

(75) Inventors: Thomas R. Podgorney, Johnstown, PA (US); Dana K. Gehman, Somerset, PA (US)

(73) Assignee: Fleetwood Folding Trailers, Inc., Somerset, PA (US)

( * ) Notice: Subject to any disclaimer, the term of this patent is extended or adjusted under 35 U.S.C. 154(b) by 0 days.

(21) Appl. No.: 11/328,652

(22) Filed: Jan. 10, 2006

(51) Int. Cl.
*B60P 3/355* (2006.01)
(52) U.S. Cl. .......................................... 296/173; 4/213
(58) Field of Classification Search ................ 296/173, 296/164, 168; 4/484, 460, 483, 323, 458
See application file for complete search history.

(56) References Cited

U.S. PATENT DOCUMENTS

| | | | | |
|---|---|---|---|---|
| 3,038,169 A * | 6/1962 | O'brien | ........................ | 4/441 |
| 3,571,822 A * | 3/1971 | Shaw, Jr. | ........................ | 4/213 |
| 3,594,825 A * | 7/1971 | Reid | ........................ | 4/663 |
| 3,752,090 A * | 8/1973 | Frankel et al. | ................. | 4/321 |
| 3,882,552 A * | 5/1975 | Turner | ........................ | 4/321 |
| 4,332,040 A * | 6/1982 | Palmer | ........................ | 296/171 |
| 4,439,875 A * | 4/1984 | Stewart et al. | ................. | 4/471 |
| 4,892,349 A * | 1/1990 | Sargent | ........................ | 296/156 |
| 5,031,249 A * | 7/1991 | Sargent | ........................ | 4/458 |
| 5,056,166 A * | 10/1991 | Sargent et al. | ................. | 4/323 |
| 5,299,327 A * | 4/1994 | Wilkerson | ..................... | 4/213 |
| 5,575,019 A * | 11/1996 | Kijewski | ....................... | 4/213 |
| 5,992,920 A | 11/1999 | Bailey et al. | | |
| 6,189,161 B1 * | 2/2001 | Rijn et al. | ..................... | 4/321 |
| 6,217,106 B1 | 4/2001 | Reckner, Jr. | | |
| 6,561,570 B2 | 5/2003 | Gehman et al. | | |

* cited by examiner

*Primary Examiner*—Kiran B. Patel
(74) *Attorney, Agent, or Firm*—The Webb Law Firm

(57) ABSTRACT

The folding camping trailer includes a trailer body having partial height sidewalls and end walls, a vertically extendable roof section, an expandable enclosure connecting the sidewalls and end walls to the roof section, and a flush toilet disposed in the trailer body. The toilet includes a waste holding tank for storing sewage waste, a toilet bowl attached to the holding tank, a drain outlet situated on the holding tank for draining the sewage waste, and a vent conduit extending from the holding tank to the roof section. The vent conduit includes a vent pipe connected to the holding tank and a vent hose connected between the vent pipe and a vent opening in the roof section. The vent hose is extendable from a first length when the roof section is in a retracted position to a second longer length when the roof section is in a raised position.

20 Claims, 8 Drawing Sheets

FOLDING CAMPING TRAILER WITH FLUSHABLE TOILET

BACKGROUND OF THE INVENTION

1. Field of the Invention

The present invention relates generally to recreational vehicles such as travel trailers, fifth-wheelers, and folding camping trailers and, more particularly, to a folding camping trailer having an integrated, permanently mounted, and fully flushable toilet.

2. Background and Description of Related Art

Generally, there are two major types or categories of vehicles in the recreational vehicle industry, namely motorized vehicle or towable vehicles. Motorized recreational vehicles ("RV's") are self-propelled. Towable RV's, or trailers, have one or more axles and require a coupling device for engaging a mating towing hitch on a towing vehicle. The invention to be disclosed herein relates generally to towable RV's or trailers.

Towable RV's or trailers have three general forms and include travel trailers, fifth-wheelers, and folding camping trailers. Conventional travel trailers and fifth-wheelers have solid, full-height sidewalls, end walls, a fixed roof, and floor. The sidewalls, end walls, roof, and floor form the internal living space of the travel trailer or fifth-wheeler. It is common in travel trailers and fifth-wheelers to have an outward extendable slide-out room or living space, generally referred to as slide-outs or slide-out areas. One such example is disclosed in U.S. Pat. No. 6,561,570 to Gehman et al.

Folding camping trailers, by contrast, do not have full-height sidewalls. Folding camping trailers generally have a floor panel, two partial-height sidewalls, two partial-height end walls and a vertically extendable roof section. To expand the useable living space, folding camping trailers typically include a flexible, typically fabric (i.e., tented), section or enclosure extending from the roof section to the sidewalls and end walls. When the roof section is in the extended or "up" position, the fabric enclosure or, alternatively, folding rigid panels may be deployed between the roof section and sidewalls and end walls to form an enclosed living space. The fabric enclosure or folding rigid panels may be referred to as the expanded living enclosure of the folding camping trailer. Folding camping trailers may include extendable sleep areas or extendable slide-out areas in much the same manner as travel trailers. An example of a folding camping trailer with extendable sleep areas is generally described in U.S. Pat. No. 6,217,106 Reckner, Jr. assigned to the same as assignee as the present application and which is incorporated herein by reference in its entirety. In the retracted or "down" position of the roof section and expanded living enclosure, the folding camping trailer provides a lightweight, low-profile vehicle that is easily towed.

A recent evolution in the RV industry combines the solid walls of a travel trailer with the lighter weight and expandability of folding camping trailers in a single unit and are referred to as "hybrids". Hybrids have the stowed appearance of a travel trailer but when set-up for occupancy they feature a slide-out area or sleep area typically with a fabric (i.e., tented) enclosure. An example of a hybrid trailer is disclosed in U.S. Pat. No. 5,992,920 to Bailey et al., the disclosure of which is incorporated by reference in its entirety. Some recent hybrid trailers known in the art even include an extendable roof section for increased headroom within the travel trailer or for ventilation purposes. However, these roof-extendable hybrid trailers are more closely related to traditional travel trailers than to folding camping trailers and do not typically include fabric (i.e., tented) enclosures or folding panels.

It is known in the industry that folding camping trailers encompass a variety of embodiments. For example, some folding camping trailers do not require tenting or folding rigid panels to form an expanded enclosed living space when the roof section is raised. Specifically, such folding camping trailers have the roof panels permanently attached to sections of the sidewalls that are generally one-half the height of a total wall section. The other half-height sidewall section is permanently attached to the trailer floor. The roof panels and the corresponding upper wall sections create an inverted four or five-sided box, which overlaps a similar but smaller and not inverted four or five-sided box including the floor and the corresponding attached lower wall sections. The roof section may be raised via numerous methods, including, but not limited to, a vertical fashion or an arcing vertical/lateral motion. In other embodiments, folding camping trailers have a multi-piece roof with two pieces overlapping horizontally in the towing mode. When the folding camping trailer is converted into the occupation mode, the two roof pieces arc upward to form an "A"-shaped peak. The vertical sides of the "A" shape are rigid panels that arc upward and latch into place, thereby forming an expanded enclosed living space. The aforementioned camping trailers are considered in the industry to be folding camping trailers because they exhibit expandability from a towing mode to an occupation mode. Additionally, such folding camping trailers share many of the numerous and unique challenges inherent in the design, engineering, and construction of folding camping trailers.

One of the most problematic and challenging creature comforts to incorporate into a folding camping trailer is a toilet. Prior art toilets presently utilized in folding camping trailers include portable toilets and cassette toilets. Portable toilets are well known devices that incorporate a toilet seat, a bowl, and a lid into a package that also includes a small flushwater reservoir and small waste holding tank. However, portable toilets are increasingly frowned upon by consumers who seek greater levels of creature comfort and convenience. Cassette toilets are an improvement over portable toilets in that the bowl, seat, and lid are part of an assembly that is permanently installed inside the recreational vehicle interior, thereby giving the toilet a seemingly more "residential-like" appearance. However, as is the case with portable toilets, cassette toilets feature a small flushwater reservoir and a small waste holding tank that must be emptied to a sanitary waste dump station somewhere in a campground. Additionally, like a portable toilet, cassette toilets are constructed primarily of plastic and do not have the customary look and feel of a residential toilet.

Thus, it can be understood that neither portable toilets nor cassette toilets offer the increasingly sought after convenience of being able to directly connect to a sanitary sewage system at a campground nor have the desired look and feel of a residential toilet. What folding camping trailer enthusiasts are increasingly seeking, and manufacturers are thereby desirous of providing, is a residential-type toilet featuring a residential-style toilet bowl that is permanently installed, provides enhanced flushwater capacity, and includes the ability to connect to either an enhanced waste holding tank or a sanitary sewage system.

The low towing profile and compact size of most folding camping trailers limits the ability to incorporate a sizeable permanently mounted waste holding tank on the folding camping trailer. It is well known that a larger tank provides greater convenience to a user by extending the time between waste holding tank "dumps". Additionally, incompatibilities exist between portable or cassette toilets and portable waste holding tanks currently provided on folding camping trailers. Further, plumbing industry code compliance mandates that a suitably dimensioned vent structure be used in conjunction with permanently mounted waste holding tanks. Specifically, the vent structure must allow waste gases to be suitably vented to the atmosphere. Numerous obstacles have prevented the ready addition of a permanent vent structure in folding camping trailers, such as slide-outs, folded tenting, and/or rigid internal structures provided in the enclosed living space of the trailer.

The foregoing limitations have restricted folding camping trailers to using the aforementioned portable toilets or cassette toilets. It is, therefore, desirable to overcome these problems and others by providing a folding camping trailer having a toilet facility that provides residential-style comfort and convenience by featuring a residential-style toilet bowl, greater flushwater and waste storage capacity, and compatibility with on-campsite/campground sanitary sewage collection systems.

SUMMARY OF THE INVENTION

The invention described herein overcomes the challenge of providing a comfortable and functional toilet facility in a folding camping trailer by addressing each of the problems described previously, particularly the problems of providing a suitable vent structure in the body of the folding camping trailer, the incorporation of a sizeable and permanently mounted sewage waste holding tank, and an improved compatibility with standard external sanitary sewage hook-ups found at most campgrounds that cater to recreational vehicles with on-board sewage storage capabilities. Accordingly, the waste holding tank disclosed herein may be connected directly to a sanitary sewage system, if available, thereby providing unlimited capacity for the disposal of flushwater and accompanying solid waste. Alternatively, the waste holding tank may be adapted to connect to a portable external holding tank if a sanitary sewage system is not available at the chosen campsite or campground.

A folding camping trailer of the present invention comprises a trailer body comprising partial height sidewalls and end walls, a vertically extendable roof section, an expandable enclosure connecting the sidewalls and roof section, and a flush toilet permanently mounted in the trailer body. The toilet includes a waste holding tank for storing sewage waste, a toilet bowl attached to the holding tank, a drain outlet situated on the waste holding tank for draining the sewage waste from the waste holding tank, and a vent conduit extending from the waste holding tank to the roof section. At least a portion of the vent conduit is typically expandable and retractable to allow the raising and lowering of the roof section without deconstruction of the vent conduit. The expandable enclosure may be a conventional "tented" enclosure. The expandable enclosure enhances the internal living space of the folding camping trailer in the manner known in the art.

The vent conduit typically comprises a vent pipe connected to the waste holding tank and a vent hose having a first end connected to the vent pipe and a second end connected to a vent outlet in the roof section. The second end of the vent hose may be secured fixedly to the vent outlet. Additionally, the first end of the vent hose may be secured fixedly to the vent pipe. A vent cover may be attached to the roof section to cover the second end of the vent hose. The vent hose may be made of any suitable material, such as plastic, and may be segmented or flexible to allow for its expansion and retraction or bending with the raising and lowering of the roof section.

The vent hose is typically extendable from a first length when the roof section is in a retracted position proximate the sidewalls and end walls to a second longer length when the roof is raised to an extended position. The expandable enclosure may comprise a sleeve at least partially enclosing the vent conduit.

A termination valve may be provided in the drain outlet for releasing sewage waste from the waste holding tank. The termination valve may be adapted to mate with an external sanitary sewage hook-up or an external holding tank.

The vent conduit may be secured to at least one of the sidewalls of the trailer body. Additionally, the vent conduit itself may be wholly or in part flexible.

Further details and advantages of the present invention will become clear upon reading the following detailed description in conjunction with the accompanying drawings, wherein like elements are identified with like reference numerals throughout.

DESCRIPTION OF THE PREFERRED EMBODIMENTS

Figure 1:
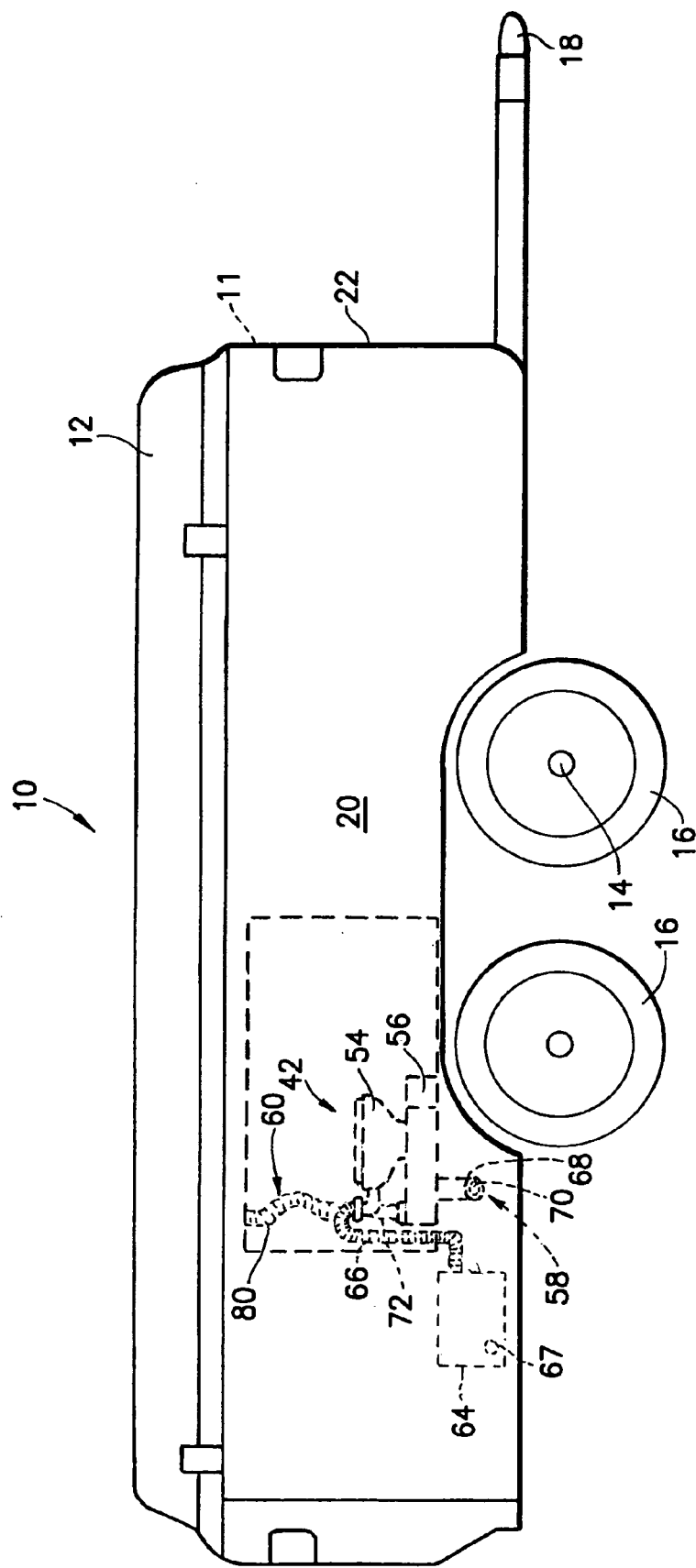
FIG. 1 is a perspective view of a folding camping trailer comprising a vertically extendable roof section which is shown in a lowered position.

For purposes of the description hereinafter, spatial or directional terms, if used, shall relate to the invention as it is oriented in the drawing figures. However, it is to be understood that the invention may assume various alternative variations, except where expressly specified to the contrary. It is also to be understood that the specific apparatus and structure illustrated in the attached drawings and described in the following specification are simply exemplary embodiments of the invention. Hence, specific physical characteristics related to the embodiments disclosed herein are not to be considered as limiting.

Figure 2:
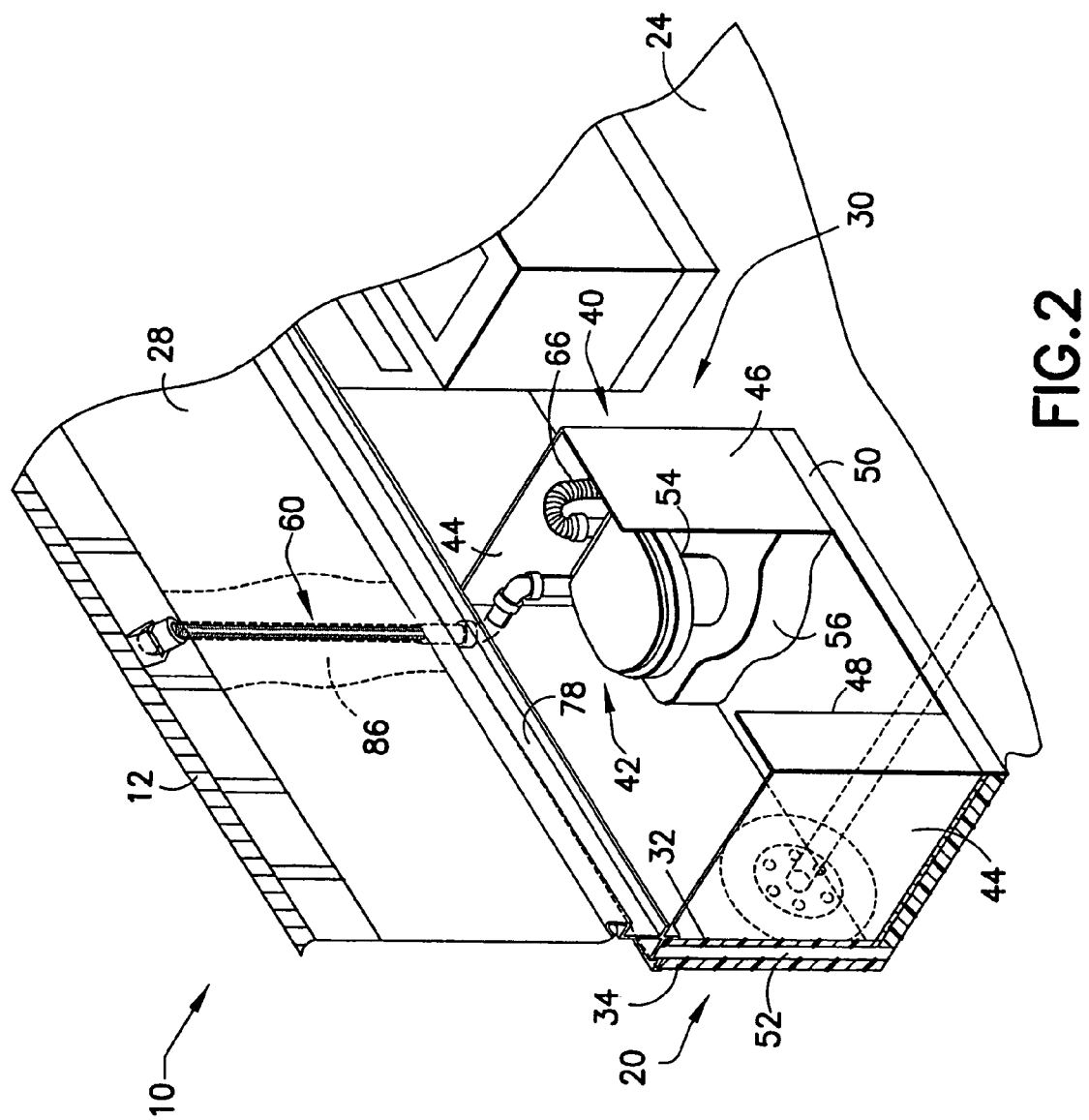
FIG. 2 is a perspective internal and partial cross-sectional view of the folding camping trailer of FIG. 1 further comprising a permanently installed toilet facility and showing the facility with the roof section in a raised position.
Figure 3:
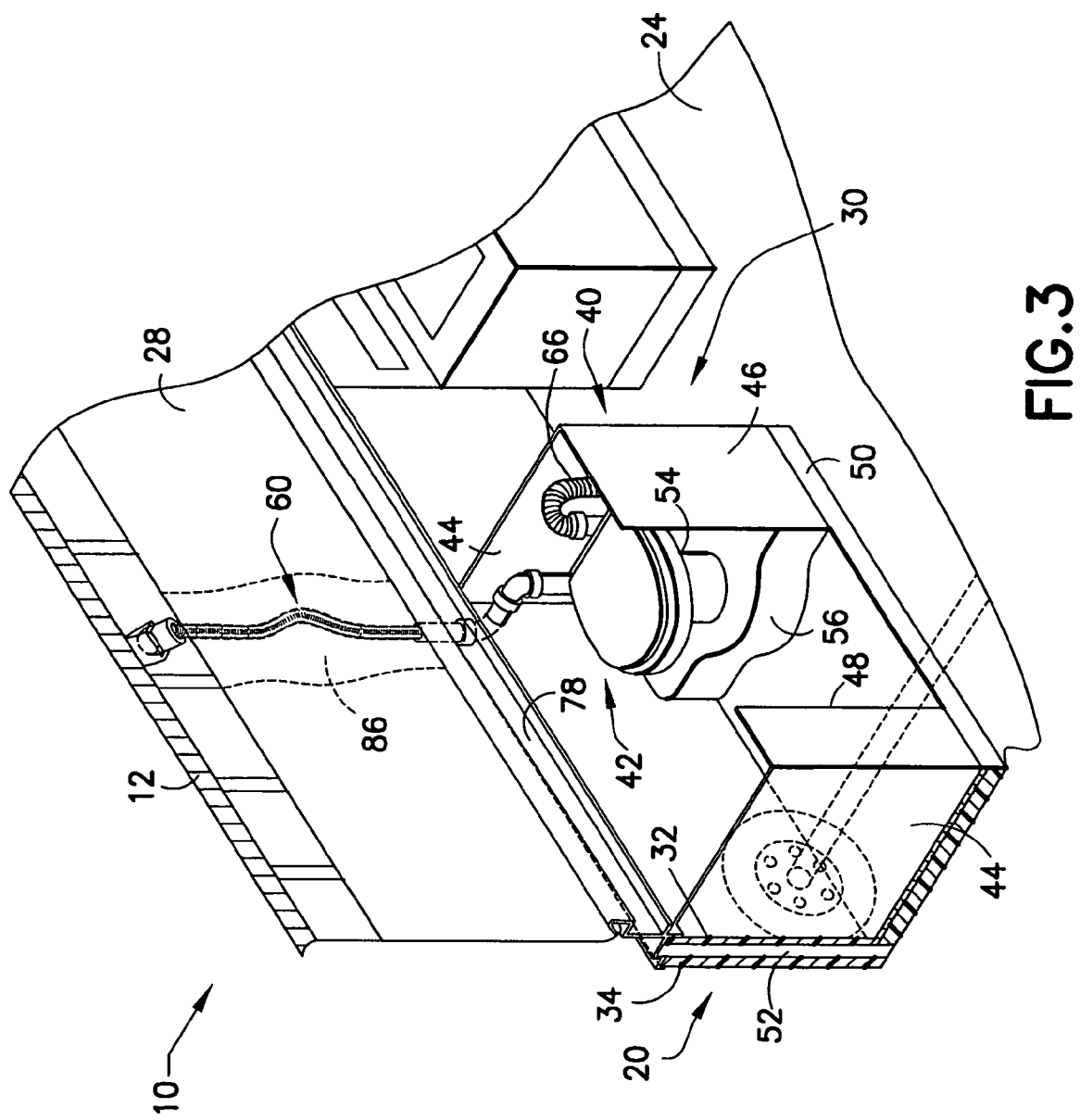
FIG. 3 is a perspective internal and partial cross-sectional view of the folding camping trailer of FIG. 1 showing the roof section in a partially lowered state.

With reference to FIGS. 1–3, a folding camping trailer 10 (hereinafter "trailer 10") and internal details thereof are shown. Trailer 10 generally comprises a trailer body 11 having a generally rectangular shape and a vertically-extendable roof section 12. Trailer body 11 is attached to a chassis 14 which has wheels 16 and a towing trailer hitch 18 for towing trailer 10. Extendable roof section 12 is extendable upward from trailer body 11 to form a set-up position or configuration of trailer 10, and retractable to the position or configuration shown in FIG. 1 which is the towing configuration of trailer 10. Trailer body 11 generally comprises two longitudinally-extending sidewalls 20 and two connecting end walls 22. Trailer body 11 further comprises a floor 24 forming a base for sidewalls 20 and end walls 22. The floor 24, end walls 22, and sidewalls 20 form a solid structure for supporting extendable roof section 12. Typically, floor 24, end walls 22, and sidewalls 20 are formed of fiberglass, plastic, or wood covered or paneled over with a fiberglass or plastic outer skin. An expandable enclosure 28, typically a flexible tenting enclosure or canopy, extends between roof section 12 and sidewalls 20 and end walls 22 in the set-up position of trailer 10. Expandable enclosure 28 and the lower solid structure formed by the floor 24, end walls 22, and sidewalls 20 of trailer body 11 encloses an internal living space 30 of trailer 10. The typically flexible nature of expandable enclosure 28 allows the expandable enclosure 28 to be expanded or compressed as the roof section 12 is raised or lowered to place trailer 10 into the set-up configuration and towing configuration, respectively. Sidewalls 20 are typically double-shelled walls each comprising an internal side or inward-facing body panel 32 and an external side or outward-facing body panel 34.

Figure 4:
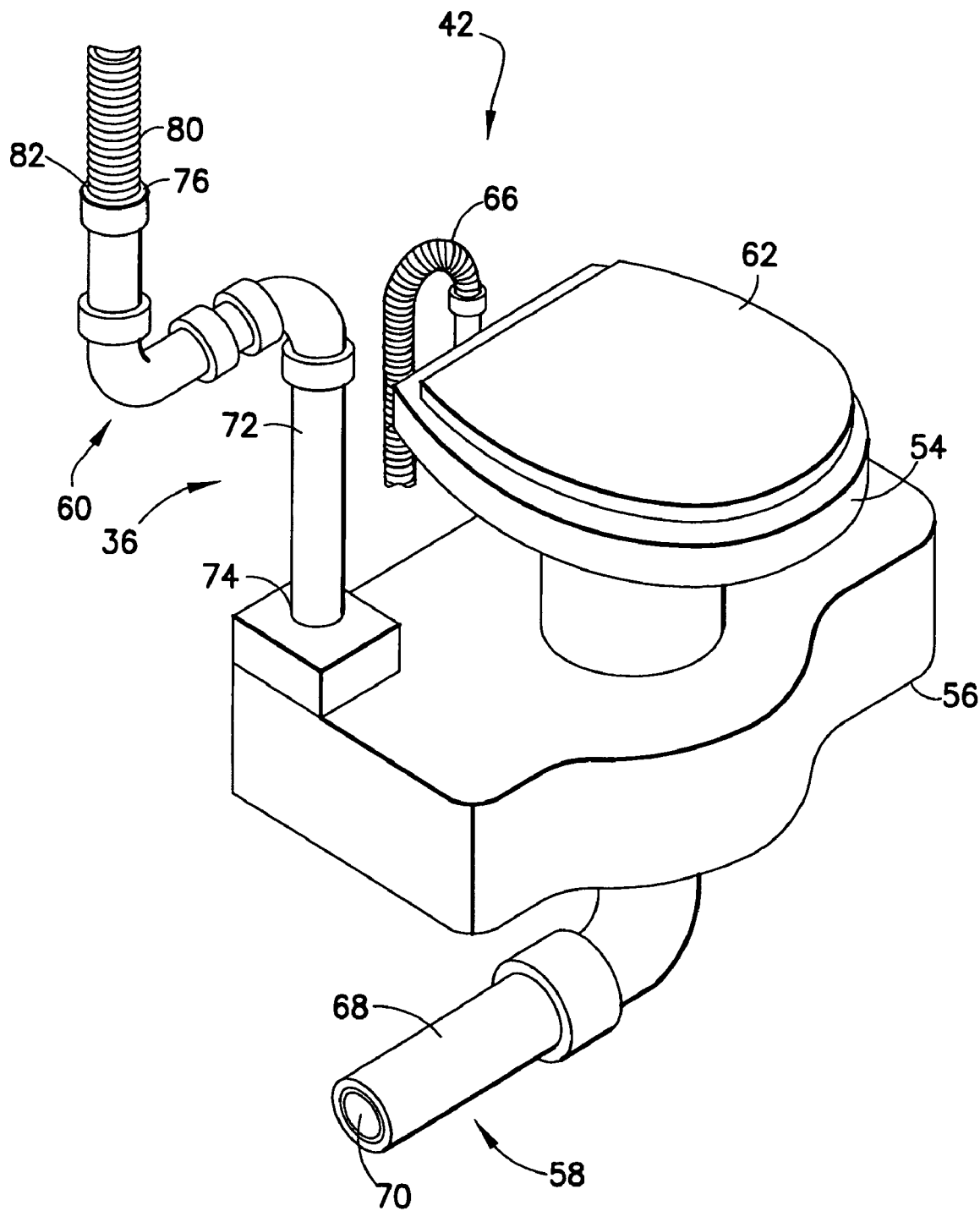
FIG. 4 is a perspective view of a flushable toilet adapted for use in the toilet facility shown in FIGS. 2 and 3.
Figure 5:
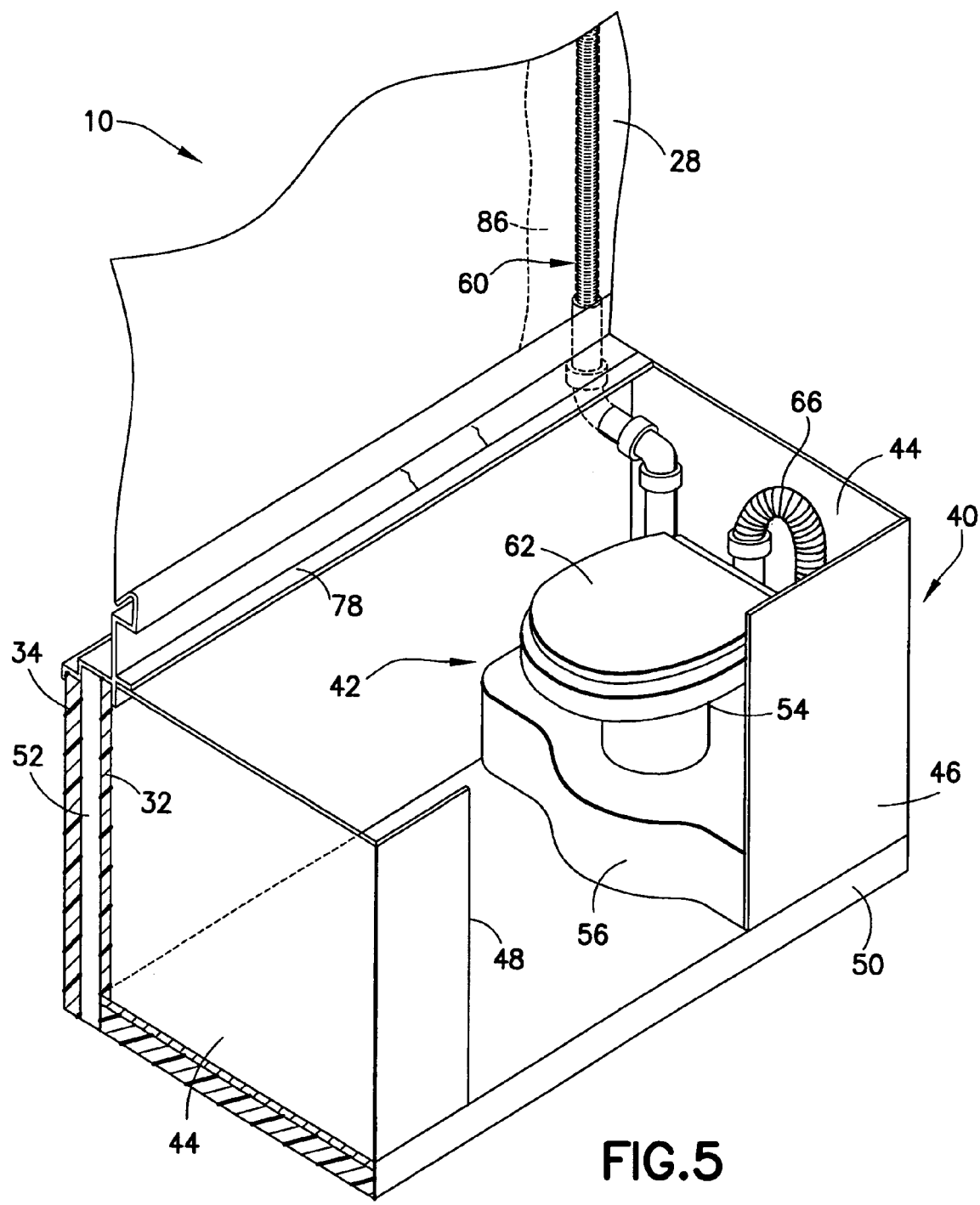
FIG. 5 is an isolated perspective view of the toilet facility shown in FIGS. 1 and 2.

With further reference to FIGS. 4 and 5, trailer 10 further comprises a toilet facility 40 integrated into trailer body 11 and permanently installed therein. Toilet facility 40 is provided in the internal living space 30 of trailer 10 and is akin to a residential (i.e., in-home) bathroom toilet found in private residences. Toilet facility 40 is permanently mounted in trailer body 11 and comprises a flushable toilet 42 similar in form and function to commodes found in private residences. As shown in FIGS. 2 and 3, sidewall internal panel 32 and sidewall external panel 34 function as the solid interior and exterior walls of trailer body 11 and, typically, form one side or wall of toilet facility 40. Toilet facility 40 further comprises enclosure end walls 44 a connecting longitudinal enclosure sidewall 46 for enclosing toilet facility 40 and providing privacy for the user thereof. Enclosure sidewall 46 defines a doorway opening 48 for receiving a door (not shown) for allowing access to toilet facility 40. Floor 24 of trailer body 11 may also form the floor of toilet facility 40, or toilet facility 40 may comprise a step-up floor panel 50 forming a step into the toilet facility 40. Sidewall internal and external panels 32, 34 define an intervening panel cavity 52 therebetween for routing of certain plumbing associated with toilet 42 as discussed herein. While toilet facility 40 is typically constructed as part of trailer body 11 during the manufacture process for trailer 10, toilet facility 40 may also be provided as a distinct, modular unit that is installed into trailer body 11 during the manufacturing process of trailer 10. Toilet facility 40 may also be provided as a modular unit for use in retrofitting existing folding camping trailers having a cassette type toilet or a portable toilet.

Flush toilet 42 generally comprises a toilet bowl 54, a waste holding tank 56, a drain outlet 58, and a vent conduit 60. Toilet bowl 54 is situated above waste holding tank 56 and in fluid communication therewith. Waste holding tank 56 is emptied via drain outlet 58 to, for example, a sanitary sewage dump as is often found at improved (i.e., commercial) camping sites or to an external waste holding tank at such a facility. Vent conduit 60 is connected to and extends upward from waste holding tank 56 to allow waste gases to be vented to the atmosphere. While waste holding tank 56 is shown disposed above the floor level defined by floor panel 50 of toilet facility 40, waste holding tank 56 may be located below floor panel 50 to more resemble an in-home toilet and improve the aesthetic appearance of toilet facility 40.

Toilet bowl 54 is similar in design to a residential-style toilet and may be constructed, for example, of ceramic material, typically marine grade ceramic metal, metal such as aluminum or plastic. Accordingly, toilet 42 typically further comprises a lid 62 for covering the opening of toilet bowl 54. Waste holding tank 56 and/or toilet bowl 54 are typically sized to raise the height of toilet 42 to a comfortable height for most users so that the user may sit in a comfortable posture while using toilet 42. A flushwater reservoir 64 is provided for flushing toilet bowl 54 with water and is intended to provide a similar bowl cleansing functionality as would be found in a flushwater reservoir on a residential commode. Thus, flushwater reservoir 64 is typically provided as a refillable tank that is in fluid communication with toilet bowl 54. Flushwater reservoir 64 is preferably the potable water tank/source of trailer 10 used for drinking/bathing purposes by the users of trailer 10. A connection conduit 66, for example a flexible hose conduit/connection, provides the connection between flushwater reservoir 64 and toilet bowl 54. The flow of flushwater from flushwater reservoir 64 to toilet bowl 54 may be controlled by suitable valving associated with connection conduit 66 to allow a fixed amount of flushwater to flow through toilet bowl 54 when the toilet 42 is flushed. Typically, the application of flushwater to toilet bowl 54 is controlled by a "flush pedal" associated with toilet 42 which, when depressed, provides pressure-assisted flushing of toilet bowl 54. Such pressure-assisted flushing of a toilet bowl is well-known in the art and may be provided by a "flushwater" pump associated with flushwater reservoir 64 for pressurizing conduit 66. Additionally, flushwater reservoir 64 may include an external connection point 67 for connecting the flushwater reservoir 64 to a source of potable (or non-potable water) at, for example, a campground. External connection point 67 allows easy refilling of flushwater reservoir 64 from any suitable source of flushwater.

Generally, the aesthetic appearance of toilet facility 40 and, primarily, toilet bowl 54 and lid 62 are intended to mimic the appearance of bathrooms found in private homes. The user may therefore enjoy similar comforts and conveniences when utilizing toilet facility 40 while at a rustic campsite or even a campground which may have, for example, rudimentary toilet and showering facilities. Accordingly, toilet bowl 54 and lid 62 may take various design formats and colors. Additionally, the internal areas of toilet facility 40, namely sidewall 46 and end walls 44, may include exposed surfaces that could be painted different colors or accept wallpaper or other interior decorating staples so that toilet facility 40 may be customized to suit the tastes of the owner of trailer 10.

As indicated, toilet bowl 54 is situated above and attached to waste holding tank 56. Toilet bowl 54 is in fluid communication with waste holding tank 56 which is adapted to accept the wastewater and contents of toilet bowl 54 when toilet 42 is flushed by a user of toilet facility 40. Accordingly, waste holding tank 56 is able to receive any waste deposited into toilet bowl 54. Any appropriate joining technique may be used to mount toilet bowl 54 to waste holding tank 56 and provide for the fluid communication between toilet bowl 54 and waste holding tank 56. Waste holding tank 56 is sized to store an adequate amount of sewage waste so that continual emptying of waste holding tank 56 is not required. For example, a desirable holding capacity for waste holding tank 56 is on the order eight gallons.

Drain outlet 58 is used to empty the contents of waste holding tank 56, preferably at an approved sewage waste disposal site/dump. Drain outlet 58 typically comprises a drain pipe 68 and a dump valve 70 adapted to connect to a conventional sanitary sewage hook-up commonly found at sites that cater to recreational vehicles. Termination or dump valve 70 is typically adapted to engage a standard sanitary sewage hook-up. As illustrated, drain pipe 68 is typically hidden beneath the floor panel 50 of toilet facility 40 and floor 24 of trailer body 11 of trailer 10, and extends outward from one of the sidewalls 20 of trailer body 11. Drain pipe 68 and termination valve 70 may also be adapted to allow the contents of waste holding tank 56 to be dumped to an external holding tank (not shown) if desired. In one possible embodiment of termination valve 70, this valve may comprise a bayonet-style coupling or equivalent to provide connectivity to an industry standard sanitary hook-ups used to empty the contents of on-board waste holding tanks typically found in recreation vehicles.

Referring now to all of FIGS. 1–8, vent conduit 60 is adapted to direct gases emanating from the waste contained waste holding tank 56 to an area outside of the trailer 10 (i.e., to the atmosphere). Vent conduit 60 is typically a multi-piece structure comprising a vent pipe 72 extending upward from waste holding tank 56 and into and upward in intervening panel cavity 52 between sidewall internal and external panels 32, 34. Vent pipe 72 has a first end 74 connected to waste holding tank 56 and a second end 76. Vent pipe 72 extends through a top rail member 78 connecting or bridging sidewall internal and external panels 32, 34, with the second end 76 projecting upward from rail member 78. Vent pipe 72 and drain outlet 58 may be comprised of conventional plumbing components, such as plastic (i.e., PVC pipe), couplings, and fittings. Typically, vent pipe 72 branches outward via a 90° elbow above the flood line of toilet 42.

Vent conduit 60 is provided to comply with applicable plumbing and/or recreational vehicle codes for directing waste gases upward and away from living space 30 of trailer body 11. To provide for the routing of waste gases to the atmosphere, vent conduit 60 further comprises a vent hose 80 connected to the second end 76 of vent pipe 72. Vent hose 80 is typically a flexible hose structure that is resiliently flexible to allow vent hose 80 to bend or flex as roof section 12 is raised and lowered during the set-up phase and take-down phase of trailer 10. Preferably, vent hose 80 remains connected between vent pipe 72 and roof section 12 throughout each phase and further while trailer 10 is deployed in the set-up configuration with roof section 12 in a raised position. In simple terms, vent hose 80 is adapted to always remain connected between vent pipe 72 and roof section 12 no matter the position of roof section 12 relative to trailer body 11. Therefore, vent hose 80 does not need to be removed before roof section 12 is retracted (i.e., during the take-down phase of trailer 10) or installed during the set-up phase of trailer 10. Vent hose 80 is intended to be permanently or semi-permanently connected between vent pipe 72 and roof section 12. Vent hose 80, in one embodiment, may comprise a spiral reinforced water hose, having a 1¼" or 1½" diameter. Vent hose 80 may be constructed of plastic such as PVC or other suitable material in a similar manner to vent pipe 72. Vent hose 80 is in fluid communication with vent pipe 72 and secured fixedly to the first end 76 of vent pipe 72 with, for example, a hose clamp or similar coupling element. Specifically, vent hose 80 comprises a first end 82 fixedly secured to the second end 76 of vent pipe 72 and a second end 84 fixedly secured to roof section 12 as discussed further herein. It will be understood that the vent hose 80 may be secured to vent pipe 72 through any suitable mechanical fastening technique, or may be a telescoping structure that is telescopically extendable from vent pipe 72, or even secured to vent pipe 72 using an adhesive, for example, plastic cement.

Figure 6:
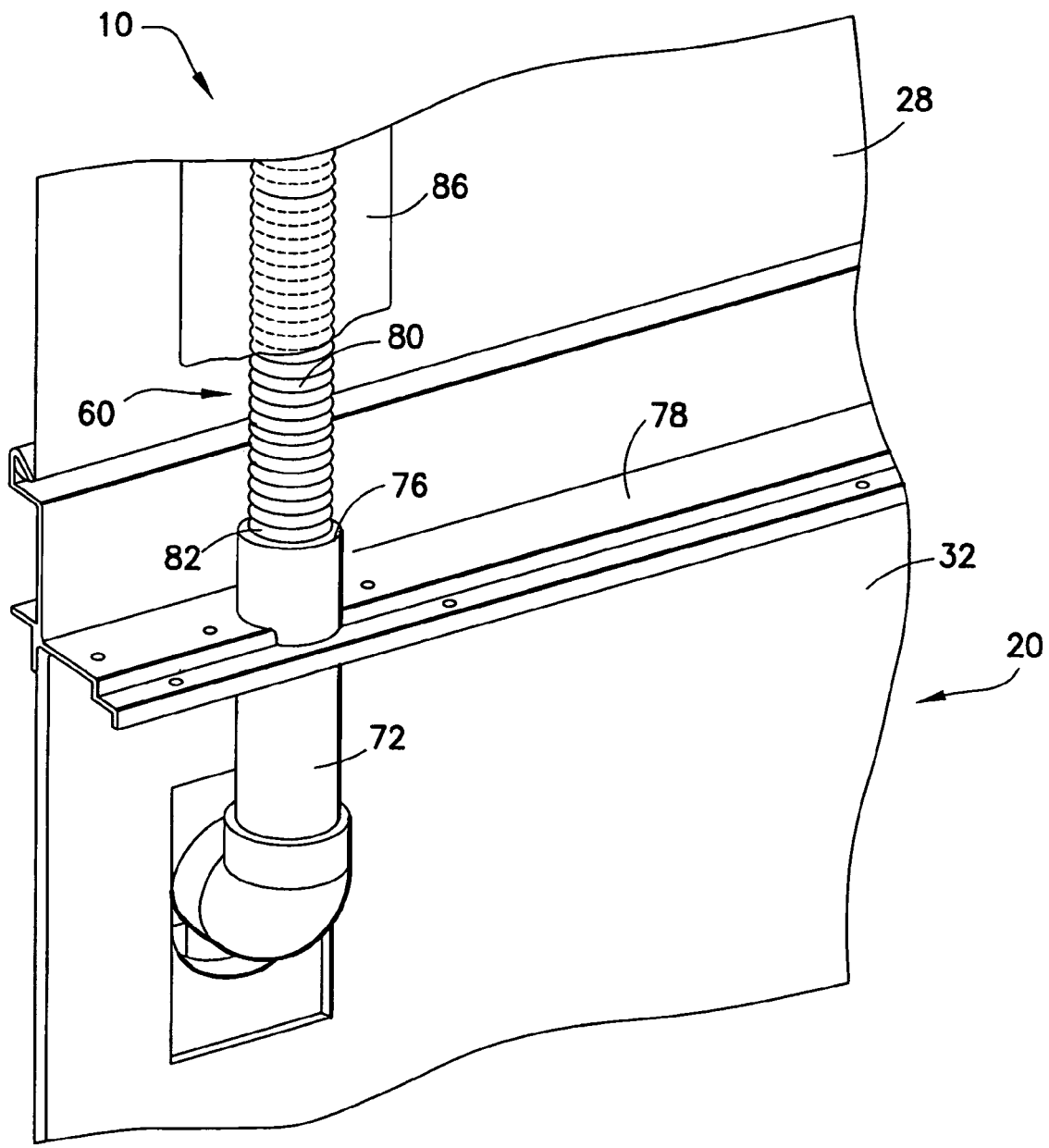
FIG. 6 is perspective view of a sidewall of the folding camping trailer of FIG. 1, illustrating a vent conduit of the toilet facility shown in FIGS. 2, 3, and 5.
Figure 7:
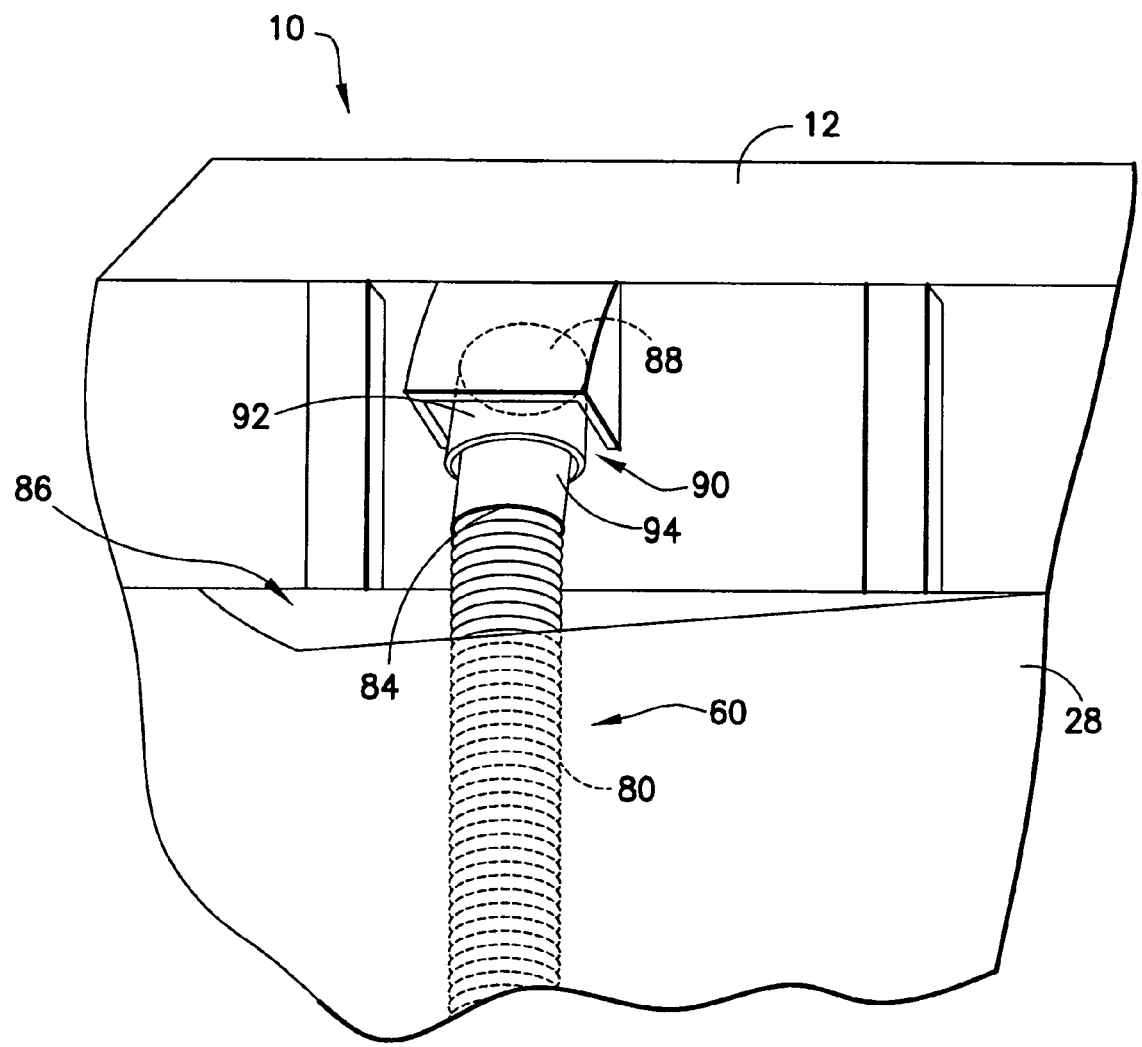
FIG. 7 is a perspective view of the vent conduit shown in FIG. 6, showing one end of the vent conduit engaged with the roof section of the folding camping trailer of FIG. 1.

As shown, primarily, in FIGS. 5 and 6, vent hose 80 of vent conduit 60 is hidden or contained within a sleeve enclosure 86 incorporated into expandable enclosure 28, for example by being hemmed thereto. Sleeve enclosure 86 is sized to allow vent hose 80 to pass therethrough and further allow vent hose 80 to bend and straighten within sleeve enclosure 86 as roof section 12 is raised and lowered. While sleeve enclosure 86 is typically a flexible structure formed of similar material as expandable enclosure 28, it will be appreciated that functionally equivalent structures to a "sleeve" may be used in place of sleeve enclosure 86. Such equivalent structures include a tunnel or cylindrical-like structure that provides sufficient lateral clearance around vent hose 80 to allow the vent hose 80 to bend as roof section 12 is lowered to a retracted position. If vent hose 80 is provided as a telescoping type structure, sleeve enclosure 86 could be tailored more narrowly to the dimensions of vent hose 80 and provide less lateral "play" around vent hose 80.

Vent hose 80 extends upwardly through the sleeve enclosure 86 to attach to roof section 12. In particular, second end 84 of vent hose 80 is connected to a vent outlet 88 provided in roof section 12. Vent outlet 88 is a cutout or opening in roof section 12 permitting the release of waste gases to the atmosphere. The second end 84 of vent hose 80 may be secured directly in vent outlet 88 or, more typically, vent outlet 88 comprises a connecting structure 90 that is secured in vent outlet 88 and is adapted to fixedly accept the second end 84 of vent hose 80. For example, a connecting structure 90 may comprise a vent coupling 92 secured in vent outlet 88 and a tubular coupling 94 extending from vent coupling 92 wherein the second end 84 of vent hose 80 is secured by mechanical fastening, friction fit, or adhesive joining techniques. A continuous vent is provided by vent pipe 72, vent hose 80 and connecting structure 90 to allow waste gases to exit waste holding tank 56 and be vented to the atmosphere. Sealed connections are preferably provided between each of these structures to ensure that fumes are prevented from entering the internal living space 30 of the trailer body 11.

Figure 8:
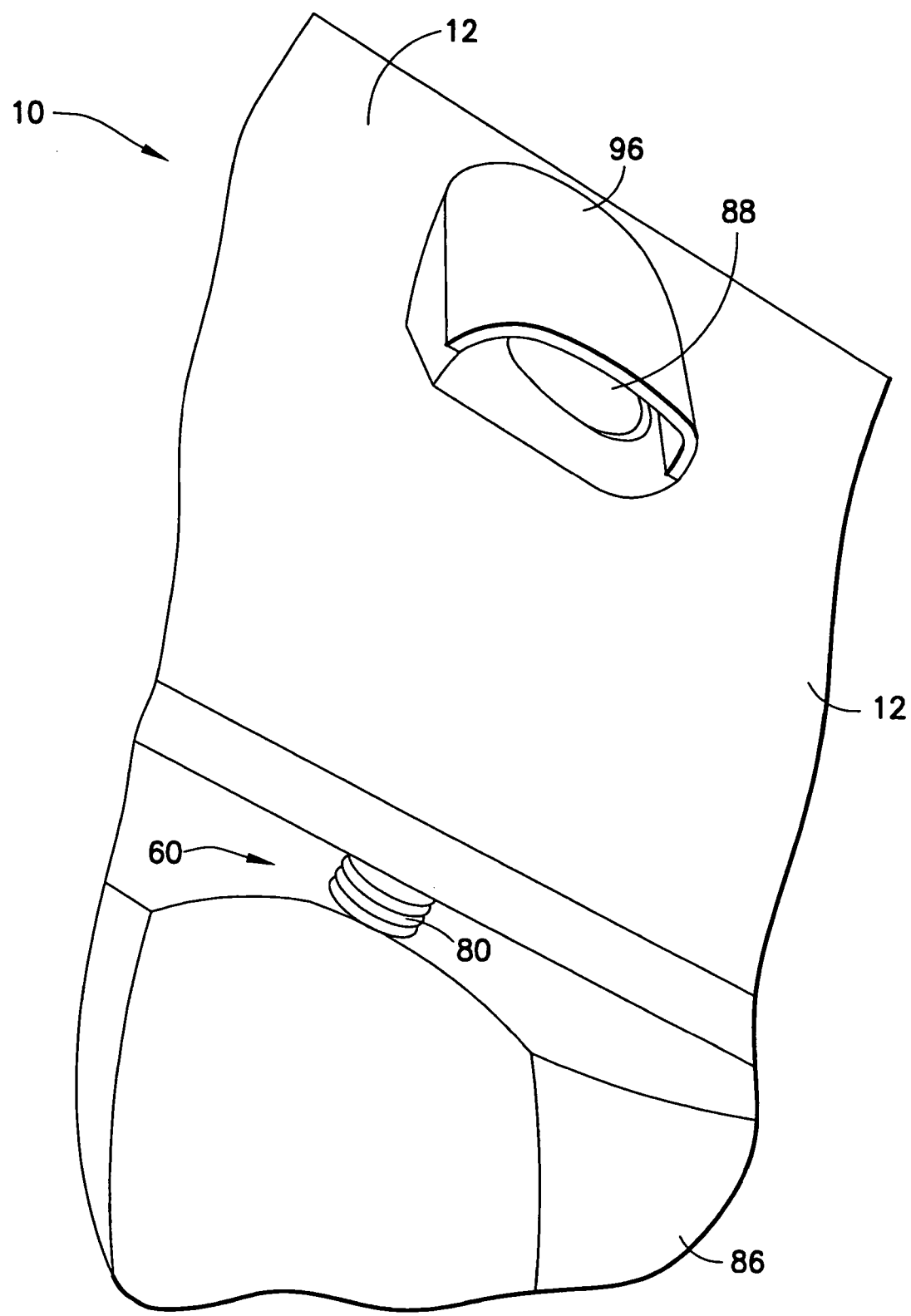
FIG. 8 is a perspective view of a vent outlet of the vent conduit shown in FIG. 7.

With specific reference to FIG. 8, roof section 12 may include a protective cover 96 designed to fit over the vent outlet 88. Protective cover 96 serves various functions including, but not limited to, focusing gases in a certain direction or preventing rainfall from entering the vent outlet 88. The protective cover 96 may be constructed of any suitable material including plastic or metal.

Vent conduit 60 provides a permanent and unrestricted path for venting sewage waste gases to the atmosphere typically at the highest point of the trailer 10, namely roof section 12, regardless of whether the roof section 12 is in the lowered or the raised position. Vent conduit 60 is formed at least in part by flexible vent hose 80 which is of sufficient flexibility to bend or fold upon itself as the roof section 12 is lowered. Therefore, vent conduit 60 does not need to be disconnected and reinstalled each time the trailer 10 is transformed from the towing configuration to the camping configuration and vice versa. As indicated, vent hose 80 may also be a telescoping conduit which is designed to expand when roof section 12 is raised, and retract when the roof section 12 is lowered. In either embodiment, as roof section 12 is raised vertically to the set-up position, expandable enclosure 28 will automatically unfold and become taut. Vent hose 80 will simultaneous be deployed (i.e., extended) within sleeve enclosure 86. Typically, vent hose 80 will "unbend" within sleeve enclosure 86 but could also telescope to an extended configuration if vent hose 80 is a telescoping structure. Conversely, as roof section 12 is lowered from the set-up position to the retracted towing position, expandable enclosure 28 and vent hose 80 will correspondingly bend or retract in sleeve enclosure 86 to allow the complete retraction of roof 12. However, vent conduit 60 will remain connected between waste holding tank 56 and roof section 12 throughout the raising and lowering operations. The location of vent hose 80 substantially contained within sleeve enclosure 86 allows the vent conduit 60 to avoid internal structures within living space 30, such as slide-out areas, retracted beds and internal fixed furniture items, that heretofore prevented the installation of permanent of semi-permanent venting structures in folding camping trailers. Without an appropriate venting structure, folding camping trailer manufacturers have been prevented from installing residential-style commodes and, accordingly, folding camping trailer manufacturers have been limited to installing cassette and portable toilets in folding camping trailers.

While the present invention was described with reference to several distinct embodiments of a folding camping trailer, those skilled in the art may make modifications and alterations to the present invention without departing from the scope and spirit of the invention. Accordingly, the foregoing description is intended to be illustrative rather than restrictive. The invention is provisionally defined by the appended claims, and all changes to the invention that fall within the meaning and range of equivalency of the claims are to be embraced within their scope.

The invention claimed is:

1. A folding camping trailer comprising a trailer body comprising partial height sidewalls and end walls, a vertically extendable roof section, an expandable enclosure connecting the sidewalls, end walls, and roof section, and a flush toilet permanently mounted in the trailer body comprising:
    a waste holding tank for storing sewage waste;
    a toilet bowl attached to the waste holding tank;
    a drain outlet situated on the waste holding tank for draining the sewage waste from the waste holding tank; and
    a vent conduit extending from the waste holding tank to the roof section.

2. A folding camping trailer as claimed in claim 1, wherein the vent conduit comprises a vent pipe connected to the waste holding tank, and a vent hose having a first end connected to the vent pipe and a second end connected to a vent outlet in the roof section.

3. A folding camping trailer as claimed in claim 2, wherein the second end of the vent hose is secured fixedly to the vent outlet.

4. A folding camping trailer as claimed in claim 2, wherein the second end is covered by a vent cover attached to the roof section.

5. A folding camping trailer as claimed in claim 2, wherein the vent hose is extendable from a first length when the roof section is in a retracted position proximate the sidewalls and end walls to a second longer length when the roof is raised to an extended position.

6. A folding camping trailer as claimed in claim 2, wherein the vent hose is formed of plastic.

7. A folding camping trailer as claimed in claim 1, wherein the expandable enclosure comprises a sleeve at least partially enclosing the vent conduit.

8. A folding camping trailer as claimed in claim 1, further comprising a termination valve provided in the drain outlet for releasing the sewage waste from the waste holding tank.

9. A folding camping trailer as claimed in 8, wherein the termination valve is adapted to mate with an external sanitary sewage hook-up or an external holding tank.

10. A folding camping trailer as claimed in claim 1, wherein the vent conduit is secured to one of the sidewalls of the trailer body.

11. A folding camping trailer as claimed in claim 1, wherein at least a portion of the vent conduit is flexible.

12. A folding camping trailer as claimed in claim 2, wherein the vent hose is secured fixedly to the vent pipe and to the vent outlet in the roof section.

13. A folding camping trailer comprising:
    a rigid vertically extendable roof section;
    a plurality of rigid and interconnecting partial height sidewalls and end walls;
    an expandable enclosure connected between the roof section and the plurality of sidewalls and end walls, wherein the roof section, sidewalls, end walls, and expandable enclosure define an interior space of the folding camping trailer;
    a waste holding tank for storing sewage waste permanently mounted within the interior space of the folding camping trailer;
    a toilet bowl attached to the waste holding tank;
    a drain outlet on the waste holding tank for draining the sewage waste from the waste holding tank; and
    a vent conduit extending from the waste holding tank to the roof section.

14. A folding camping trailer as claimed in claim 13, wherein the vent conduit comprises a vent pipe connected to the waste holding tank, and a vent hose having a first end connected to the vent pipe and a second end connected to a vent outlet in the roof section.

15. A folding camping trailer as claimed in claim 14, wherein the second end of the vent hose is secured fixedly to the vent outlet.

16. A folding camping trailer as claimed in claim 14, wherein the second end is covered by a vent cover attached to the roof section.

17. A folding camping trailer as claimed in claim 14, wherein the vent hose is extendable from a first length when the roof section is in a retracted position proximate the sidewalls and end walls to a second longer length when the roof is raised to an extended position.

18. A folding camping trailer as claimed in claim 14, wherein the vent hose is formed of plastic.

19. A folding camping trailer as claimed in claim 13, wherein the expandable enclosure comprises a sleeve at least partially enclosing the vent conduit.

20. A folding camping trailer as claimed in claim 13, wherein at least a portion of the vent conduit is flexible.

* * * * *